United States Patent [19]

Jarzynka

[11] 4,270,572
[45] Jun. 2, 1981

[54] HINGING DOWNSPOUT ASSEMBLY

[76] Inventor: Clifford J. Jarzynka, 802 N. Harvard St., Harvard, Nebr. 68944

[21] Appl. No.: 78,912

[22] Filed: Sep. 26, 1979

[51] Int. Cl.³ .............................................. F16L 27/00
[52] U.S. Cl. ........................................ 137/615; 52/16
[58] Field of Search .................... 52/16; 137/873, 874, 137/615

[56] References Cited

U.S. PATENT DOCUMENTS

| 445,516 | 1/1891 | West | 137/874 |
|---|---|---|---|
| 2,975,805 | 3/1961 | Horn | 137/615 |
| 3,060,952 | 10/1962 | Bystrom | 137/119 X |
| 3,316,928 | 5/1967 | Weakley | 137/615 X |
| 3,330,291 | 7/1967 | Smith | 137/120 |
| 3,375,851 | 4/1968 | Henry et al. | 137/120 X |
| 3,911,954 | 10/1975 | Johnson | 137/615 |
| 4,135,540 | 1/1975 | Felsen | 137/615 X |

Primary Examiner—Gerald A. Michalsky
Attorney, Agent, or Firm—Hiram A. Sturges

[57] ABSTRACT

A hinging down-spout assembly having a first elongated section to which a second elongated section is attached by a hinge whereby the second section can swing from a position approximately at a right angle to the first section into a position parallel to the first section for storage, a lapping section attached to the first section and extending at approximately a right angle to the first section and extending under and around the sides of the second section for directing water flow between the elongated sections.

6 Claims, 4 Drawing Figures

HINGING DOWNSPOUT ASSEMBLY

BACKGROUND OF THE INVENTION

Hinging down-spout assemblies of the prior art have had pivot bolts connecting two tubular gathering sections together so that a section which is normally horizontal can be swung into vertical position, but such pivot bolts have the disadvantage of catching leaves whereby the guttering tends to clog. Sometimes this clogging is made worse by water freezing around the leaves, resulting in a non-functioning guttering system.

Other disadvantages of the prior art have chiefly been costly waste of construction and it is an object of this invention to provide an effective hinged guttering down-spout assembly of economical construction for easy affordability, and one that uses a hinge on the outside rather than a pivot bolt on the inside so that clogging by leaves and twigs is avoided.

Another objective of this invention is to provide for a minimizing of leakage at times when the water flow is heavy.

In the prior art proposals for hinging down-spouts have sometimes been very expensive in the attempt to achieve a down-spout that will lower itself when the rain comes. It is my concept that a hinging down-spout must be inexpensive and of the least bulk so as to be attractive and not have a self-lowering feature so as to be simple, compact and attractive.

It is, therefore, an object of this invention to use a lapping section, lapping two elongated sections and fastened to one of them, whereby if the lapping section extends generally horizontally, then if the elongated horizontal section is in the upper storage position at a time when a rain comes, then at least the bulk of the water will be directed by the lapping section to flow at a right angle outwardly from the vertical down-spout section, thereby minimizing the effect which a non-lowering of the swinging down-spout section would have.

I have discovered that the lapping section can be made of a piece of the same material from which the elongated sections are made so as to have the same beveled corners and the same appearance with economy of construction. At first this would seem impossible but I have found that by bending the lapping section into a somewhat different shape that adjacent parts of the horizontal section, the lapping section will receive the horizontal section very well, and will direct water into it almost completely, and even more so if a gasket, which I propose, is disposed between the lapping section and the horizontal section. This makes an attractive appearance, as all three sections seem to match.

Another object of this invention is to provide a down-spout assembly, either end of which can be used in the vertical position, so that the customer can have a choice in that matter.

It is also important that the down-spout, when folded, have no unusual sharpness projecting out where it could injure a person passing and striking the sharp projection by cutting into a child's bare foot or digging into the bone of a person's shin.

SUMMARY OF THE INVENTION

A major object of this invention is to provide a hinging down-spout assembly, having first and second elongated tubular sections, disposed at approximately a right angle to each other in use, a hinge assembly attaching adjacent sides of the first and second sections together so that the first and second sections can be hinged into parallel positions for storage, a lapping section attached to the first section and disposed on the opposite side of the second section from the hinge assembly, and bridging a gap between the first and second sections for directing water between the first and second sections, the lapping section being of a trough shape and extending under and up the sides of the adjacent end of the second elongated section so as to receive the latter section therein.

Another object of the invention is to provide a gasket between the lapping section and the second section, so as to prevent the escape of water from the down-spout assembly.

Still another objective is to provide a latching assembly for releasably interconnecting the first and second sections to hold them in parallel position

BRIEF DESCRIPTION OF THE DRAWINGS

FIG. 1 is also used to show an alternate position of use in which the lapping section extends generally vertically and in which it is the second section that is disposed vertically for attachment to a vertical section of spouting, not shown, the position of the first elongated section to which the lapping section is attached is shown in FIG. 1 in dotted lines to illustrate a storage position of the first section when the alternate position of this invention is being used. The alternate position of the lapping section is not shown, however, to avoid confusion.

DESCRIPTION OF THE PREFERRED EMBODIMENT

Figure 1:
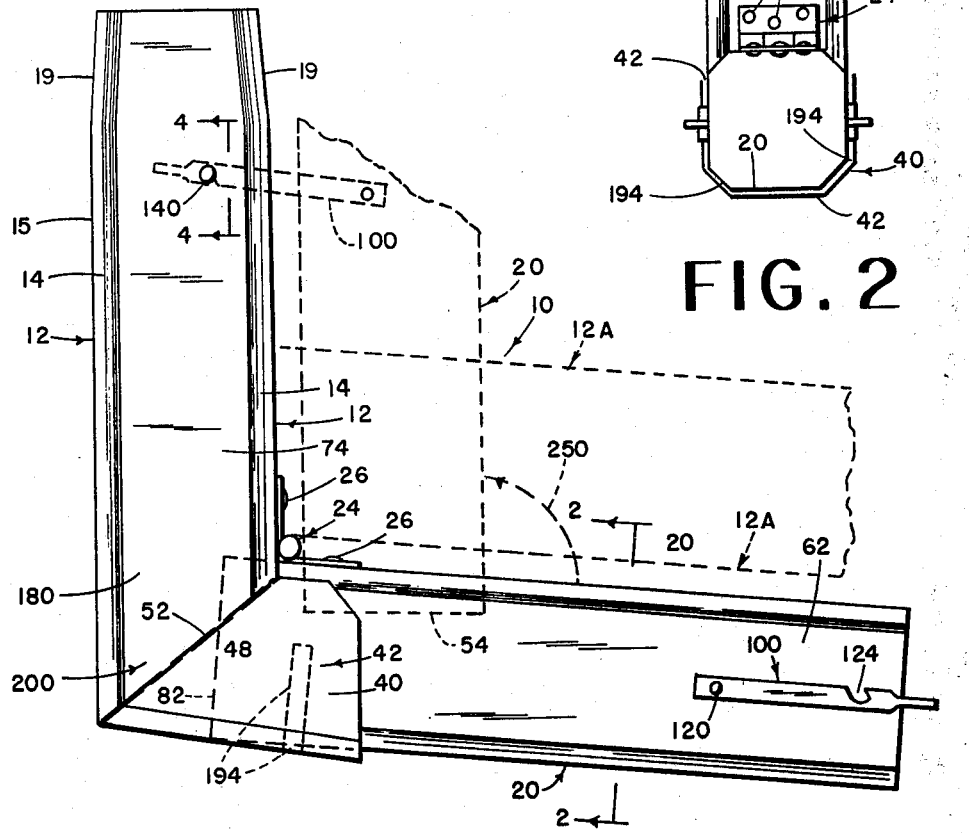
FIG. 1 shows in full lines one of the two positions in which the gutter spout of this invention can be used, namely, with a lapping section extending generally horizontally and supporting a second longer section. An upper folded storage position of the second elongated section being shown in dotted lines.

The gutter spout hinging tip assembly of this invention is generally indicated at 10 in FIG. 1 in a first way of attachment, and has a first elongated section 12 which, in the first position of use of this invention, can be also called an upper section 12 of a conventional kind of spouting which is substantially rectangular in cross-section, but which has corners which are beveled, as best seen at 14.

The first or upper section 12 has its upper end crimped in somewhat at 19, so as to be insertable into the lower end of a similarly cross-sectionally shaped vertical house-mounted gutter spout, not shown.

The gutter spout assembly 10 further has a generally horizontal second elongated portion 20 which is attached by a hinge 24 and rivets 26 to the vertical first section 12.

And so the second section 20 can be swung up from the position shown in FIG. 1 into the substantially vertical dotted line position alongside the vertical first section 12 for storage.

Figure 2:
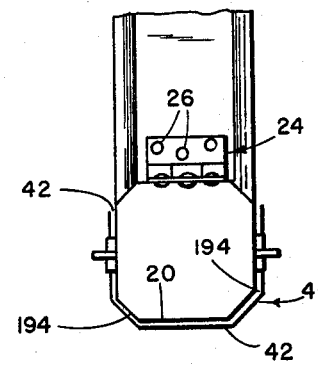
FIG. 2 is a sectional view taken along the line 2—2 of FIG. 1.

The assembly 10 further includes a third or lapping section 40 which is also made of the same kind of gutter spouting, although the lapping section 40 in cross-section is cut off at its upper side so that the remainder is substantially C-shaped, as best seen in FIG. 2, with the top side open as seen at 42 to let the horizontal second section 20 swing upward.

The lapping section 40 laps the underside and the sides of the section 20 at the inner end thereof under the hinge 24 and has a inner edge 48 which is preferably inclined at substantially a right angle with respect to the vertical, and forms a butt joint with a similarly inclined edge 52 of the lower end of the vertical section 12 and the edges at 48 and 52 are firmly fixed together by solder for sealing the joint.

The lapping section 40 is not exactly the same in shape as the lower part of the section 20 because it has been somewhat distorted out of shape so as to lap the outerside of the section 20.

So as best seen in FIG. 2, the edge of the lapping section 40 which is farthest from the joint at 48 and 52 is larger in outline than the sides of the sections 20 and the upper edges 54 of the lapping sections 40 are spaced outwardly substantially more from the vertical sides of the section 20, such sides being seen at 62, extend-out more at their upper ends than at their lower, which has the effect of receiving and funneling in the section 20 into the lapping section 40 as the section 20 is bent down thereinto.

It is somewhat surprising that the side surfaces 74 of the section 12 and the side surfaces 62 of the horizontal section 20' are disposed the latter inside of the former by a slight distortion of the section 14 or the section 20 or both, so that it works just fine being crammed into this position by the funneling effect of the lapping section 40.

The inner edge of the section 20 is seen at 82.

As thus described, when the section 20 is swung upwardly the lapping section 40 will direct water away from a house which is useful in case the owner is not home to swing the section down into the horizontal position. This is also useful in the wintertime when the section 20 might be left in the vertical position throughout the season, and being out of the way, this prevents water from freezing in the section 20.

Some of the distortion of the lapping section can be seen by the inclination of its line at 92, which would be parallel to the line 94 if there were no distortion or change in shape.

The section 20 can be held to the section 14 by latches 100, one being disposed on each side of the section 20 and the hinge about hinge rivets 120, each latch having a notch 124 in it to be received on a catch 140, fixed to the upright section 12, which is received in the notch 124 as the latches 100 are swung into the dotted line position shown in FIG. 1.

Figure 3:
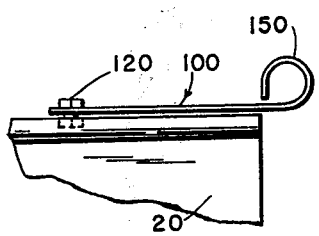
FIG. 3 is a top plan view of the right-hand corner of the hinging spout of FIG. 1 with the remainder of the hinging spout broken away.
Figure 4:
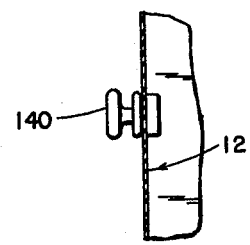
FIG. 4 is a view of a segment of FIG. 1 as seen generally along the line 4—4 of FIG. 1.

It is best seen in FIG. 3 that the outer end of each latch 100 has a handle 150 curled over to make it easy to grip.

The upper edge 170 of the vertical section 180 of the lapping assembly 200 is preferably low enough so as the section 20 is folded upward the edge 170 will not bump the side of a building which is very close to the rearward side 15 of the vertical section 12.

Referring to FIG. 2, a gasket seen at 194 in FIG. 3 can extend across the underside of the horizontal section 20 for sealing a gap between the horizontal section of the lapping section 40, seen at 42, and the horizontal section 20 itself.

If there is a little leakage in addition to the business of the gasket, then it would be substantially harmless anyway since in case of rain the sidewalk is wet to some degree anyhow.

ALTERNATE WAY OF USE

An alternate way of using the device is to use the second section 20 in the first way of use as the vertical section. The second section 20 is purposely not crimped at its terminal end because the lower end of a vertical down-spout is ordinarily crimped, and so the second section 20, if used in a vertical position, would need to be uncrimped at its terminal end and be inserted onto the outer side of the vertical down-spout already there.

The second section 20, or the section 12, whichever is used horizontally, can be provided with crimps for it to be ready to be inserted into another section of pipe to extend horizontally.

Whichever section of the first and second sections 12 and 20 of this product is used in the vertical position during use, that section must be uncrimped to receive a crimped vertical down-spout, not shown.

I claim:

1. A hinging down-spout assembly comprising first and second elongated sections disposed when said second section is in use at substantially a right angle to each other, said sections each having a first side a second side and a right side and a left side, a hinge assembly having a hinge axis and attaching first sides of said first and second sections together in a manner whereby said first and second sections can be hinged into storage position in parallelism with each other, said axis being at one end of said first section, said first section having its said one end inclining substantially at an acute angle with respect to the elongation of said first section, a lapping section attached to said first section and having a connecting portion disposed on the opposite side of said second section from said hinge, said lapping section having right and left side portions spaced apart along a line parallel with said axis and disposed transverse to said axis in substantial parallelism with each other and extending adjacent right and left sides respectively of said second section and serving as a trough to direct water flowing between said first and second sections.

2. The hinging down-spout assembly of claim 1 in which said lapping section is joined to said one end of said first section along a plane disposed at approximately 45° with respect to the elongation of said first section.

3. The hinging down-spout assembly of claim 2 in which said connecting portion extends at an angle of slightly more than 90° with respect to the elongation of said first section.

4. The hinging down-spout assembly of claim 1 in which said second section extends inwardly of said first section a short distance at times when said second section is in a use position of maximum hinging away from said first section as limited by the position of said lapping section.

5. The hinging down-spout assembly of claim 1 in which a gasket is disposed between said second and the inner side of said lapping section.

6. The down-spout assembly of claim 1 in which a latch and catch assembly releasably interconnects said sections together at times when they are disposed in storage position.

* * * * *